United States Patent
Fukuda (10) Patent No.: US 12,093,170 B2
(45) Date of Patent: Sep. 17, 2024

(54) MEMORY SYSTEM

(71) Applicant: Kioxia Corporation, Tokyo (JP)

(72) Inventor: Akifumi Fukuda, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 14 days.

(21) Appl. No.: 17/895,776

(22) Filed: Aug. 25, 2022

(65) Prior Publication Data

US 2023/0185709 A1  Jun. 15, 2023

(30) Foreign Application Priority Data

Dec. 13, 2021 (JP) .................................. 2021-202016

(51) Int. Cl.
*G06F 12/02* (2006.01)
*G06F 3/06* (2006.01)

(52) U.S. Cl.
CPC ........ *G06F 12/0246* (2013.01); *G06F 3/0616* (2013.01); *G06F 3/0653* (2013.01); *G06F 3/0679* (2013.01); *G06F 2212/7211* (2013.01)

(58) Field of Classification Search
CPC .. G06F 12/0246; G06F 3/0616; G06F 3/0653; G06F 3/0679; G06F 2212/7211
See application file for complete search history.

(56) References Cited

U.S. PATENT DOCUMENTS

| | | |
|---|---|---|
| 8,086,787 B2 | 12/2011 | Chen et al. |
| 9,298,606 B2 | 3/2016 | Ramanujan |
| 2014/0136884 A1* | 5/2014 | Werner .............. G11C 16/3422 714/6.11 |
| 2016/0070643 A1 | 3/2016 | Shen |
| 2020/0225850 A1 | 7/2020 | Rastogi et al. |
| 2023/0114414 A1* | 4/2023 | Seyedzadeh ........... G11C 29/18 714/42 |

\* cited by examiner

*Primary Examiner* — Gary W. Cygiel
(74) *Attorney, Agent, or Firm* — Maier & Maier, PLLC (57) ABSTRACT

A memory system includes a non-volatile memory and a memory controller. The memory controller includes a counter, the memory controller being configured to control a write operation to the non-volatile memory and a read operation from the non-volatile memory and configured to obtain wear information of the non-volatile memory. The memory controller is configured to update the counter based on the wear information, generate a trigger with a predetermined probability, and execute a persistence process configured to store information of the counter in a non-volatile manner based on the trigger.

17 Claims, 5 Drawing Sheets

MEMORY SYSTEM

CROSS REFERENCE TO RELATED APPLICATIONS

This application claims the benefit of priority to Japanese Patent Application No. 2021-202016, filed on Dec. 13, 2021, the entire contents of which are incorporated herein by reference.

FIELD

An embodiment of the present dislosure relates to a memory system including a non-volatile memory.

BACKGROUND

In recent years, a memory system including a non-volatile memory has become widely used. For example, a solid-state drive (SSD) having a NAND flash memory is known as such a memory system.

DESCRIPTION OF EMBODIMENTS

A memory system according to the present embodiment can reduce costs without impairing the accuracy of the understood state of a non-volatile memory.

A memory system according to an embodiment includes a non-volatile memory and a memory controller. The memory controller includes a counter, the memory controller being configured to control a write operation to the non-volatile memory and a read operation from the non-volatile memory and configured to obtain wear information of the non-volatile memory. The memory controller is configured to update the counter based on the wear information, generate a trigger with a predetermined probability, and execute a persistence process configured to store information of the counter in a non-volatile (persistent) manner based on the trigger.

Hereinafter, a memory system according to an embodiment is described in detail with reference to the drawings. In the following description, components having substantially the same functions and configurations are denoted by the same symbols, and duplicate descriptions are given only when necessary. Each of the embodiments described below exemplifies a device and a method for embodying a technical idea of the present embodiment. The technical idea of the embodiment is not limited to the material, shape, structure, arrangement, and the like of the structural elements described later. Various modifications may be made to the technical idea of the embodiment in addition to the scope of the claims.

The following embodiments may be combined with each other as long as there is no technical contradiction.

1. First Embodiment

The memory system according to a first embodiment is described. A memory system 1 according to the first embodiment includes, for example, a memory controller 10 and a non-volatile memory 20. The non-volatile memory 20 is an example of a semiconductor memory device. The memory controller 10 controls the non-volatile memory 20. In the present embodiment, the memory controller 10 has a function of controlling a read operation and a write operation of the non-volatile memory 20.

A tolerance of the non-volatile memory to the read operation and write operation is finite. Therefore, when the predetermined number of read operations and write operations are executed for a particular memory cell, the electrical characteristics of the memory cell deteriorate. When the electrical characteristics of the memory cell deteriorate, the function of storing data in the memory cell deteriorates. In the following embodiments, the deterioration of the electrical characteristics of the memory cell in the non-volatile memory is referred to as "wear". A degree of the wear (the degree of deterioration of the electrical characteristics) is referred to as "degree of wear". For example, the deterioration of the electrical characteristics of the memory cell depends on the number of times that the write operation and the read operation are executed to the memory cell. Therefore, in this case, the number of times these operations are executed is referred to as "wear information". In the following embodiment, since the write operation and the read operation are executed in units of a page, the terms wear, degree of wear, and wear information are used for each page.

The definition of "wear information" depends on the type of non-volatile memory. For example, in the case of a non-volatile memory in which wear due to the write operation and wear due to the read operation are at the same level, the number of times that the write operation and the read operation are executed for a target page can be wear information. In the case of a non-volatile memory that is not worn in the read operation and worn only in the write operation, only the number of times that the write operation is executed for the target page can be the wear information. In the case of a non-volatile memory that is not worn in the write operation and worn only in the read operation, only the number of times that the read operation is executed for the target page can be the wear information. In the case of a non-volatile memory that is worn in an erase operation in addition to the write operation and the read operation, the number of times that the erase operation is executed for the target page in addition to the write operation and the read operation can be the wear information.

For example, in the case where a memory cell provided in the target page is worn by the read operation and the write operation for a page adjacent to the target page, the number of times that the write operation and the read operation are executed for the adjacent page can be the wear information in addition to the number of times that the write operation and the read operation are executed for the target page.

In the non-volatile memory, there is a possibility that the memory cell cannot store data or the data stored in the memory cell is lost due to wear of the memory cell provided in the target page. Therefore, it is preferred to track and manage the degree of wear of the memory cell.

1-1. Overall Configuration of Memory System 1

Figure 1:
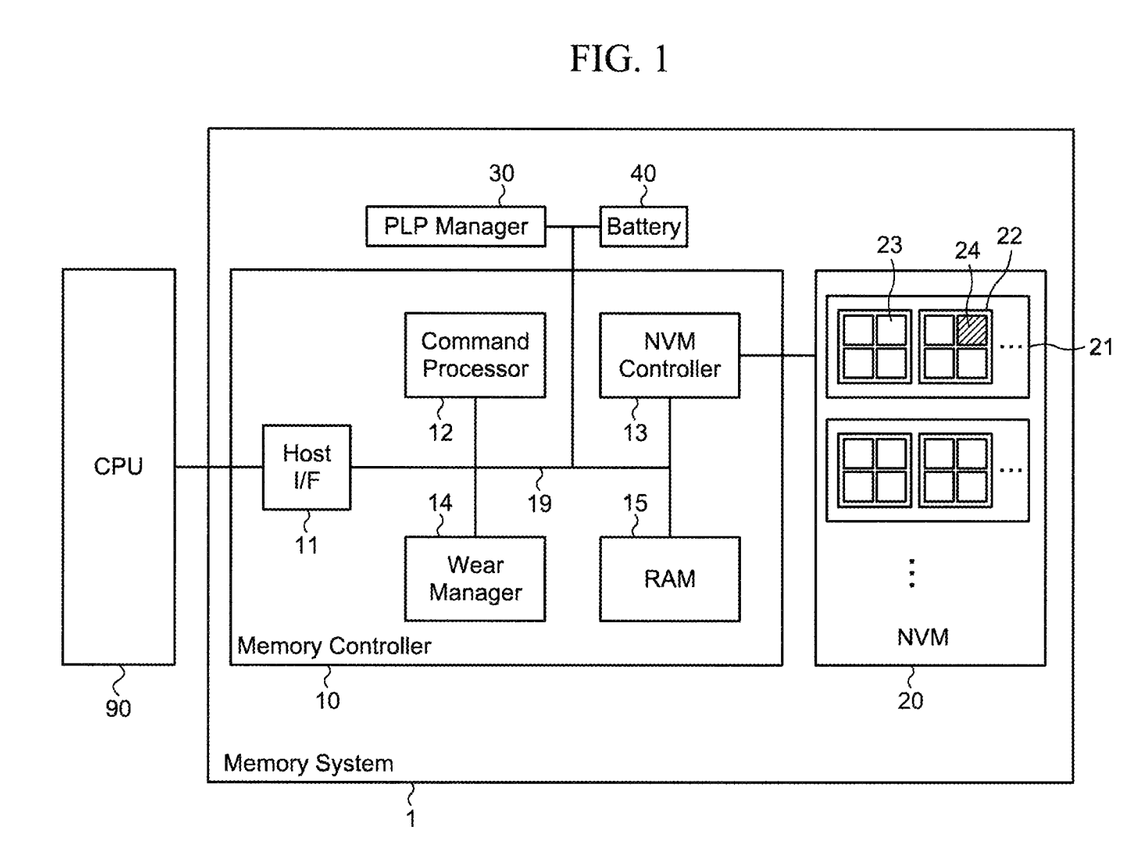
FIG. 1 is a block diagram showing a configuration of a memory system according to an embodiment.

FIG. 1 is a block diagram for explaining a configuration of a memory system according to an embodiment. As shown in FIG. 1, the memory system 1 includes the memory controller 10, the non-volatile memory (NVM) 20 including a plurality of memory cells, a power loss protection circuit (PLP Manager) 30, and a backup battery (Battery) 40. The power loss protection circuit 30 and the backup battery 40 are connected to the memory controller 10. The memory system 1 is connectable to a central processing unit (CPU) 90 and functions as the main memory device of the CPU 90.

The CPU 90 is mounted on an electronic device such as, for example, a personal computer, a portable terminal (e.g., a tablet computer or a smart phone), and an imaging device, or the like. The electronic device is also referred to as an information processing device. The information processing device may include the memory system 1 and the CPU 90. The CPU 90 sends a write request and a read request to the memory system 1. In FIG. 1, although a configuration having one CPU 90 is exemplified, a plurality of CPUs 90 may be provided, and the plurality of CPUs 90 may be connected to each other. The CPU 90 may be replaced by another calculation processing device such as a graphics processing unit (GPU) or an accelerator.

The memory system 1 may be an external memory device. In this case, the CPU 90 of FIG. 1 may be replaced by a host computer. In this case, the memory system 1 may be a memory card or the like in which the memory controller 10 and the non-volatile memory 20 are configured as a single package or may be an SSD (Solid State Drive) or the like.

The non-volatile memory 20 includes a plurality of memory chips 21. The memory controller 10 controls each of the plurality of memory chips 21. Specifically, the memory controller 10 executes the write operation and the read operation for each of the memory chips 21. Each of the plurality of memory chips 21 is connected to the memory controller 10 via a bus. Each memory chip 21 includes a plurality of blocks 22. Each block 22 includes a plurality of pages 23. In the present embodiment, the write operation and the read operation are executed in units of the page 23. Therefore, management of the wear information and the like described below is executed in units of a page.

As will be described in detail later, a part of an area of the non-volatile memory 20 (a part of the blocks 22 or a part of the pages 23) is used as a storage destination of the information when counter information of a wear management section 14 is a persistence process. The area is referred to as a "counter storage area 24". That is, the counter storage area 24 stores the counter information of the wear management section 14.

The memory chip 21, the block 22, and the page 23 are examples of a hierarchical structure or grouping of memories, and an embodiment of the present disclosure is not limited to the above configuration. In addition to the write operation and the read operation, an erase operation may be executed in units of a page. Each of the write operation, the read operation, and the erase operation may be executed in the same unit (unit of the memory chip 21, the block 22, or the page 23), and at least one of each operation may be executed in a different unit. The write operation, the read operation, and the erase operation may be executed in units of a memory cell.

The non-volatile memory 20 stores data in a non-volatile manner, and is, for example, an SCM (Storage Class Memory). A semiconductor memory device such as a NAND type flash memory having a three-dimensional structure, a NOR type flash memory, a cross-point type memory, a phase change memory (PCM), a magnetoresistive random access memory (MRAM), a resistive random access memory (ReRAM), a ferroelectric random access memory (FeRAM), and an oxide semiconductor random access memory (OSRAM) are used as the SCM. The non-volatile memory 20 does not have to be a semiconductor memory device. The present embodiment can be applied to various storage media other than a semiconductor memory device.

In the memory chip 21 of the non-volatile memory 20, the plurality of memory cells are arranged in an array. Each memory cell is capable of recording binary values or multiple values (3 or more values). The memory chip 21 includes a word line and a bit line connected to the plurality of memory cells. For example, a location of the memory cell (or page) is specified by a physical address including a chip address, a word line address, a bit line address, and the like that identifies the memory chip 21.

The SCM used in the non-volatile memory 20 is a memory intermediate between the main memory such as a DRAM (Dynamic Random Access Memory) and a storage such as a NAND flash memory. In particular, the SCM is an intermediate between the DRAM and the NAND flash memory in terms of operating speed, manufacturing costs, and lifetime of a memory cell. In other words, the number of accesses of the SCM is not substantially unlimited, unlike DRAM, so it is necessary to manage the degree of wear of the memory cell. A granularity of access in the SCM is expected to be as small as the DRAM. For example, a read unit or a write unit of the DRAM is about 32 B or 64 B. On the other hand, the read unit or write unit of the NAND flash memory is about 4 KB.

The memory controller 10 controls the write operation to the non-volatile memory 20 according to the write request from the CPU 90 and controls the read operation from the non-volatile memory 20 according to the read request from the CPU 90.

For example, the memory controller 10 is a semiconductor integrated circuit configured as an SoC (System-On-a-Chip). Although some or all of the operations of each component of the memory controller 10 described below are implemented by hardware, some or all of the operations may be implemented by the CPU (Central Processing Unit) executing firmware.

The memory controller 10 includes a host interface (Host I/F) 11, a command processor section (Command Processor) 12, an NVM controller section (NVM Controller) 13, the wear management section (Wear Manager) 14, and a RAM 15. These functional blocks are interconnected by an internal bus 19.

The host interface 11 receives the write request and the read request from the CPU 90 that functions as a host. The write request includes a write command, a write address, and write data. The read request includes a read command and a read address. The host interface 11 transfers the received write request or read request to the command processor section 12. The host interface 11 sends user data read from the non-volatile memory 20, a response of the command processor section 12, and the like to the CPU 90.

The command processor section 12 executes control according to a command received from the CPU 90 via the host interface 11. For example, when the write request is received from the CPU 90, the command processor section 12 converts a write address corresponding to a logical address into a physical address according to the write command. This conversion determines the physical address in the non-volatile memory 20. The command processor section 12 executes a write operation for the physical address based on the write data. For example, LBA (Logical Block Addressing) is used as the logical address. The physical address indicates a physical location of the page in which the data is stored in the non-volatile memory 20. The command processor section 12 outputs the write data received from the CPU 90 and the physical address determined by the conversion to the NVM controller section 13 and the wear management section 14.

When a read request is received from the CPU 90, the command processor section 12 converts a read address corresponding to the logical address into a physical address. This conversion determines a physical address in the non-volatile memory 20. The command processor section 12 executes the read operation of data for the physical address. The command processor section 12 outputs the physical address determined by the conversion to the NVM controller section 13 and the wear management section 14.

The NVM controller section 13 accesses the non-volatile memory 20 based on the type of access (the write operation or the read operation) input from the command processor section 12 and the above physical address, and executes control of the read operation or the write operation for the non-volatile memory 20. The NVM controller section 13 may include an ECC (Error Check and Correct) circuit. The ECC circuit executes an error correction encoding process for the data transferred from the command processor section 12 to generate parities. The ECC-circuit outputs a codeword including data and parities to the non-volatile memory 20. The ECC circuit executes an error correction decoding process using the codeword read from the non-volatile memory 20 and transfers decoded data to the command processor section 12.

The wear management section 14 acquires and manages the physical address of the non-volatile memory 20 and the wear information of the pages allocated to the physical address from the non-volatile memory 20. For example, in the present embodiment, the wear management section 14 manages the number of times (hereinafter referred to as "the number of write operations" and "the number of read operations") the write operation and the read operation are executed for a page allocated at a predetermined physical address. The wear management section 14 stores information indicating the number of write operations and the number of read operations for a particular page (frequency information) in the RAM 15 together with the physical address of the page. That is, the RAM 15 has a function as a counter in which the wear information of the page is stored. The RAM 15 may be referred to as a "wear counter." The wear management section 14 manages the number of write operations and the number of read operations by updating the wear counter according to the execution of the write operation and the read operation. In other words, the wear management section 14 updates the wear counter based on the wear information. The wear counter manages the physical address of the page in association with the number of write operations and the number of read operations for the page.

The wear management section 14 generates a trigger with a predetermined probability when the write operation or the read operation is executed for a page. For example, the wear management section 14 stores the wear counter information in a part of the non-volatile memory 20 (the "counter storage area 24" as described below) based on the trigger. This process may be referred to as a "persistence process." That is, the persistence process is a process by which the wear counter information stored in a volatile manner is stored in a non-volatile (persistent) manner based on the trigger. Details of the function of the wear management section 14 and the persistence process will be described later.

The memory for storing the wear counter information by the persistence process may be the page 23 belonging to the same block 22 as the page 23 in which the write operation or the read operation is executed, or may be the page 23 belonging to a different block 22. In the latter case, the memory for storing the wear counter information may be the page 23 belonging to the same memory chip 21 as the page 23 in which the write operation or the read operation is executed and a different block 22 from the page 23 mentioned above, or may be the page 23 belonging to a block 22 included in a different memory chip 21.

For example, the RAM 15 is used as a data buffer. As described above, the RAM 15 functions as a wear counter and stores the number of write operations and the physical address managed by the wear management section 14 in a non-volatile (persistent) manner. The RAM 15 may be referred to as a cache memory. Furthermore, the RAM 15 temporarily holds data received from the CPU 90 by the memory controller 10 until the data is stored in the non-volatile memory 20. The RAM 15 temporarily holds the data read from the non-volatile memory 20 until the data is transmitted to the CPU 90. For example, a general-purpose memory, such as an SRAM (Static Random Access Memory) or a DRAM (Dynamic Random Access Memory), can be used as the RAM 15. In the present embodiment, although the configuration in which the RAM 15 is provided in the memory controller 10 is exemplified, the present disclosure is not limited to this configuration. The RAM 15 may be provided outside the memory controller 10.

The power loss protection circuit 30 detects that an external power supplied to the non-volatile memory 20 is cut off (hereinafter referred to as "disconnection"). An unintentional and inappropriate disconnection of the power source provided from the outside is referred to as an "inappropriate disconnection" The power loss protection circuit 30 supplies power from the backup battery 40 to the non-volatile memory 20 upon detection of the inappropriate disconnection. The persistence process may be executed when the inappropriate disconnection is detected, in addition to the trigger described above.

1-2. Configuration of Wear Management Section 14

Figure 2:
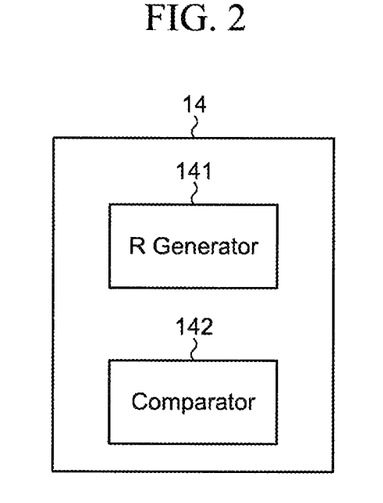
FIG. 2 is a diagram showing a configuration of a wear management section in a memory system according to an embodiment.

The detailed configuration of the wear management section 14 will be described with reference to FIG. 2. As shown in FIG. 2, the wear management section 14 includes a random number generator (R Generator) 141, a comparator 142, and a counter. The random number generator 141 generates a random value without regularity. The random number generator 141 generates a random number R based on a process in which the wear management section 14 updates the wear counter of the RAM 15. The comparator 142 determines whether the random number R generated by the random number generator 141 is included in a predetermined group S. When it is determined that the random number R is included in the predetermined group S, the comparator 142 generates a trigger for executing the persistence process. That is, the trigger is generated with a predetermined probability by a range of the random number R generated by the random number generator 141 and a range of the predetermined group S defined in the comparator 142.

In the present embodiment, the predetermined group S for which the comparator 142 makes the above determination is a constant group regardless of the type of request from the CPU 90, the type of operation of the memory controller 10, various historical information, and the wear information and the like. Specifically, the comparator 142 determines whether the random number R is included in the same group S, regardless of whether the operation of the memory controller 10 is the write operation or the read operation.

However, the group S may be a different group depending on the type of request from the CPU 90, the type of the operation of the memory controller 10, various historical information, and the wear information and the like. That is, the comparator 142 may determine whether the random number R is included in a different group S depending on whether the operation of the memory controller 10 is the write operation or the read operation. Alternatively, the comparator 142 may determine whether the random number R is included in a different group S depending on an operation history of the non-volatile memory 20 (e.g., a ratio of the current number of write operations to an upper limit (endurance) of the number of write operations).

In the present embodiment, although a configuration in which the random number generator 141 and the comparator 142 are used as described above as a method for generating a trigger with a predetermined probability is exemplified, the present disclosure is not limited to this configuration. Other configurations may be adopted as long as the trigger can be generated with a predetermined probability.

1-3. Wear Leveling Process

Although the memory controller 10 executes the write operation to the non-volatile memory 20 and the read operation from the non-volatile memory 20 according to the write request and the read request from the CPU 90, the write operation and the read operation may be repeated to a part of pages. If the non-volatile memory 20 repeatedly executes the write operation and the read operation from a particular page, the particular page may be worn and lose the ability as a memory cell.

It is possible to suppress the wear of the specific page by executing the wear leveling process by the memory controller 10. The wear leveling process is a process of changing the correspondence between the logical address and the physical address. Even if the write request and the read request from the CPU 90 are concentrated to a part of pages specified by the logical address, the write operation and the read operation are executed for pages with different physical addresses by changing the corresponding relationship. Therefore, it is possible to suppress the concentration of the wear to the memory cell provided in the part of pages.

For example, the logical address and physical address in the wear leveling process are specified in units of a page. Therefore, in the wear leveling process, the number of write operations and the number of read operations are managed in units of a page, and the correspondence relationship between the logical address and the physical address is changed in units of a page. However, the above process may be executed in units of a plurality of pages or may be executed in units of a block. In addition to or instead of the change of the correspondence relationship between the logical address and the physical address as described above, data may be moved from the address before a change to the address after the change.

A pre-process of the wear leveling for determining whether the wear leveling process is executed before the wear leveling process is carried out. In the pre-process of the wear leveling, it is determined whether the wear leveling process needs to be executed according to the state of the wear counter or historical information related to other wear. For example, in the case where the number of write operations and the number of read operations for the physical address of the page, where the data write operation and the read operation are executed, are impartial, it is determined that there is no need to execute the wear leveling process, and a process of the next step is executed without executing the wear leveling process. On the other hand, in the case where the number of write operations and the number of read operations are partial, the wear leveling process is executed. The pre-process of the wear leveling is executed based on the update process of the wear counter of the RAM 15.

In the above configuration, a capacity of the cache memory (the RAM 15) used as the wear counter is sufficiently smaller than a capacity of the non-volatile memory 20. Compared to the capacity of the cache memory, the capacity of the data to be persisted at the time of the inappropriate disconnection is sufficiently small. Since the persistence process needs to be executed frequently to prevent the loss of the wear information even at the time of the inappropriate disconnection, memory bandwidth is consumed by the increase of the access to the non-volatile memory 20. Therefore, it is necessary to maintain accurate wear information while suppressing the number of accesses to such memory.

Furthermore, in the wear leveling process, in the case where the persistence process is executed only when the number of write operations and the number of read operations for a particular page reach a predetermined number of times, if a phenomenon that the inappropriate disconnection occurs immediately before the predetermined number of times occurs many times, the wear information for the page is not correctly updated.

According to the memory system 1 of the present embodiment, the persistence process is not executed every time the wear counter is updated, but the persistence process is executed based on a trigger generated with a predetermined probability with respect to the update of the wear counter. Therefore, the number of accesses to the non-volatile memory 20 is suppressed. Furthermore, since the persistence process is executed with a predetermined probability, even if a particular phenomenon occurs as described above, it is possible to suppress a problem that the wear information is not updated correctly. As a result, the memory system 1 can accurately understand the state of the non-volatile memory 20. Since the frequency of persistence of the wear information can be reduced by the above process, the consumption of the memory bandwidth can be reduced. In other words, it is possible to reduce the memory chip for the memory bandwidth consumed, and it is possible to reduce the cost.

1-4. Operation Flow of Wear Leveling Process and Persistence Process

Figure 3:
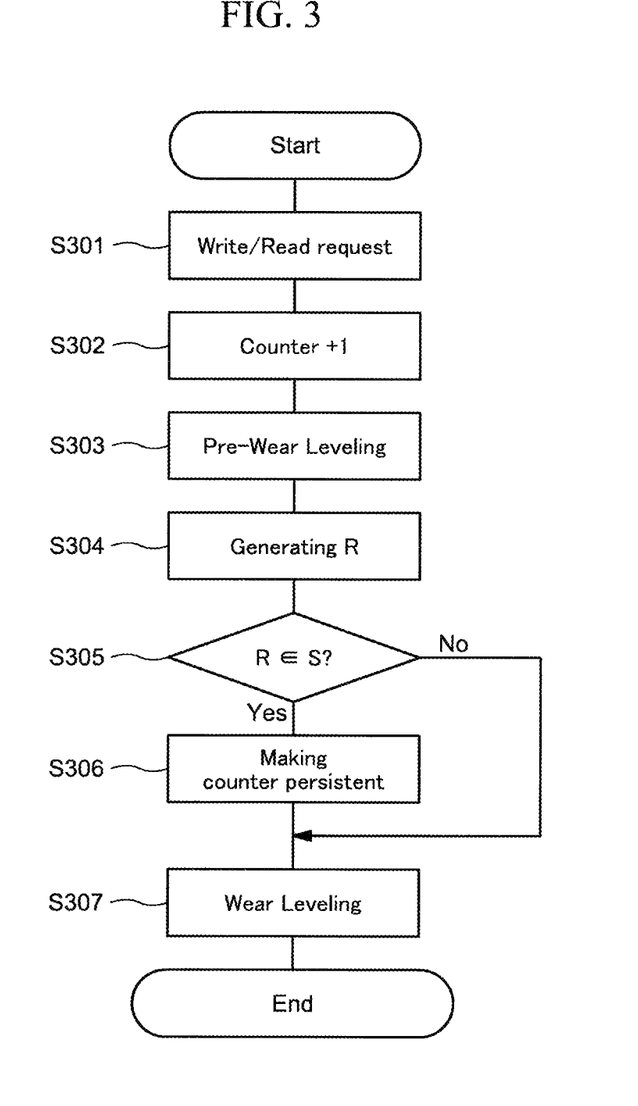
FIG. 3 is a flowchart showing a persistence process of a memory system according to an embodiment.

An operation of the persistence process will be described with reference to FIG. 3. FIG. 3 is a flowchart showing the persistence process of the memory system according to an embodiment.

As shown in FIG. 3, firstly, the write request or the read request (Write/Read request) is transmitted from the CPU 90 to the memory system 1 (step S301).

The write address (logical address) included in the write request or the read address (logical address) included in the read request is converted to a physical address, and the wear counter corresponding to the physical address is updated (step S302). Specifically, the counter corresponding to the physical address is incremented by 1 (Counter+1).

When the wear counter is updated, the pre-process of the wear leveling (Pre-Wear Leveling) is executed (step S303). Specifically, it is determined whether the value of the wear counter corresponding to the physical address reaches a predetermined threshold value. When the value of the counter reaches the predetermined threshold value, a following wear leveling process is executed, and when the value does not reach the threshold value, the wear leveling process is not executed. The operation flow shown in FIG. 3 is an operation flow when the wear leveling process is executed.

When the pre-process of the wear leveling is executed, the persistence process of the wear counter is executed with a predetermined probability (steps S304 to S306).

Specifically, firstly, a random number R is generated (Generating R) (S304). That is, the random number generator 141 generates the random number R following the execution of the pre-process of the wear leveling mentioned above. Next, it is determined whether the generated random number R is included in the predetermined group S (R∈S?) (S305).

The probability that the persistence process is executed is determined by the generated random number R and the group S. For example, in the case where the probability is set to 1/128, a numeric range in which the random number R is generated is set to an integer from 0 to 1023, and the group S is set to an integer from 0 to 7. Of course, each range of the random number R and the group S is not limited to the above range. For example, the numerical range in which the random number R is generated may be set to an integer from 0 to 1023, and the group S may be a set 0 and composed of multiples of 128.

In the case where the generated random number R belongs to the group S ("Yes" in S305), the persistence process (Making counter persistent) is executed (S306). On the other hand, in the case where the generated random number R does not belong to the group S ("No" in S305), the persistence process is not executed, and the wear leveling process (Wear Leveling) is executed (step S307).

As described above, in the present embodiment, although the operation flow in which the steps of the generation of the random number R (S304) to the persistence process (S306) are executed between the pre-process of the wear leveling (S303) and the wear leveling process (S307) is exemplified, the present disclosure is not limited to this operation flow. For example, the steps of S304 to S306 may be executed between the update of the wear counter (S302) and the pre-process of the wear leveling (S303). Alternatively, the steps of S304 to S306 may be executed after the wear leveling process (S307). In the present embodiment, although a configuration in which the steps of S304 to S306 are consecutive is exemplified, these steps may not be consecutive as long as the order of S304 to S306 is maintained, and other processes may be executed between these steps.

As described above, in the present embodiment, regardless of the write request or the read request from the CPU 90, that is, regardless of whether the operation of the memory controller 10 is the write operation or the read operation, the comparator 142 determines whether the random number R is included in the same group S. However, the above operation may be executed for only the write request from the CPU 90 or may be executed for only the read request from the CPU 90.

2. Second Embodiment

A memory system according to the second embodiment will be described with reference to FIG. 4. Since a configuration of the memory system according to the second embodiment is the same as the configuration of the memory system according to the first embodiment, the description thereof will be omitted. In the second embodiment, the probability of the trigger occurring for the persistence process is different depending on the type of event to occur. As an example, an operation flow in the case where the wear information includes both the number of write operations and the number of read operations, and the degree of wear with respect to the write operation and the degree of wear with respect to the read operation are different will be described.

2-1. Operation Flow of Wear Leveling Process and Persistence Process

Figure 4:
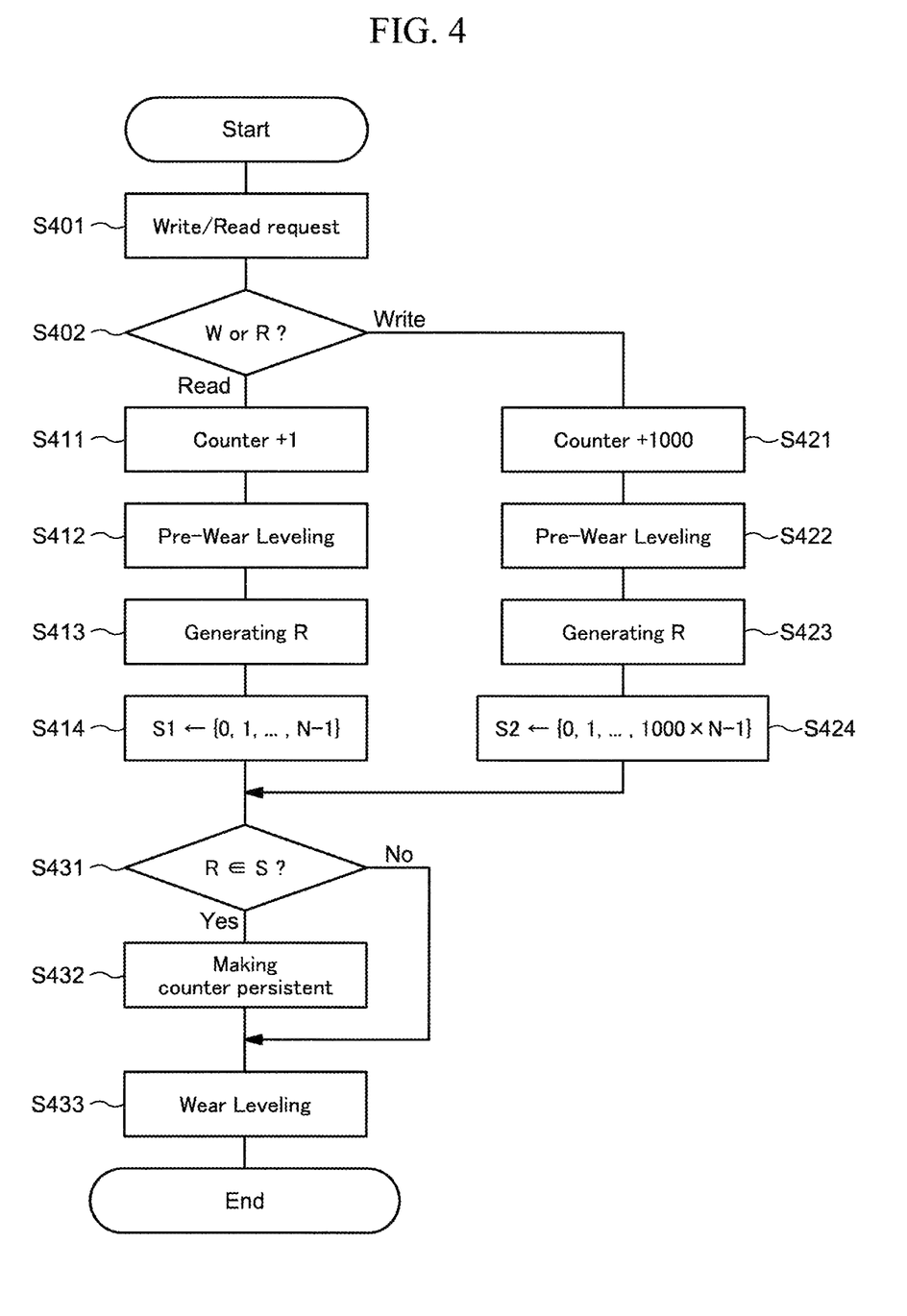
FIG. 4 is a flowchart showing a persistence process of a memory system according to an embodiment.

As shown in FIG. 4, firstly, the write request or the read request (Write/Read request) is transmitted from the CPU 90 to the memory system 1 (step S401).

It is determined whether the signal transmitted from the CPU 90 is the write request or the read request (step S402). If the signal transmitted from the CPU 90 is the read request ("Read" in S402), a read operation flow (step S411 to S414) is executed. On the other hand, if the signal transmitted from the CPU 90 is the write request ("Write" in S402), a write operation flow (step S421 to S424) is executed.

Since S411 to S413 in the read operation flow are the same as those of S302 to S304 of FIG. 3, the description thereof is omitted. Although S421 to S423 in the write operation flow are similar to S411 to S413 in the read operation flow, S421 to S423 are different from S411 to S413 in that it is incremented by 1 in S411, while it is incremented by 1000 in S421. For example, in the case where the degree of wear with respect to the write operation is 1000 times the degree of wear with respect to the read operation, the degree of wear can be reflected in a numerical value of the counter by adjusting the number of increments as described above. In each of the read operation flow and the write operation flow, the group S (S1, S2) is selected (S414, S424) after the generation of the random number R (S413, S423). In the case of the read operation flow, an integer from "0" to "N−1" (N is a natural number greater than or equal to 2) is selected as the group S1 (S414). In the case of the write operation flow, an integer from "0" to "1000×N−1" is selected as the group S2 (S424).

In the present embodiment, although a configuration in which the flow branches according to the request transmitted from the CPU 90 is exemplified, the present disclosure is not limited to this configuration. For example, after the generation of the random number R, the group S1 or the group S2 may be selected according to the write operation or the read operation.

In the case of the read operation flow, after the selection of the group S1 (S414), it is determined whether the random number R generated in S413 is included in the selected group S1 (R ε S?) (step S431). In the case of the write operation flow, after the selection of the group S2 (S424), it is determined whether the random number R generated in S423 is included in the selected group S2 (R ε S?) (S431). Since the steps S431 to S433 are the same as S305 to S307 of FIG. 3, the description thereof is omitted.

As described above, the number of integers included in the group S2 in the write operation flow is 1000 times the number of integers included in the group S1 in the read operation flow. Therefore, the probability of executing the persistence process with respect to the write request is 1000 times the probability of executing the persistence process with respect to the read request.

For example, in the case where the degree of wear with respect to the write operation is larger than the degree of wear with respect to the read operation, the persistence processing can be executed at a more appropriate timing by changing the probability of executing the persistence processing according to each operation as described above. That is, in the case where the degrees of wear of the target page are different depending on the occurrence of the event, the persistence process can be executed at a more appropriate timing by changing the probability of executing the persistence process depending on the type of the event.

As described above, in the present embodiment, depending on the write request or the read request from the CPU 90, that is, depending on whether the operation of the memory controller 10 is the write operation or the read operation, the comparator 142 determines whether the random number R is included in a different group S1 or group S2. In the present embodiment, although the configuration in which the probability of executing the persistence process is higher when the write operation is executed than when the read operation is executed is exemplified, the probability of executing the persistence process may be higher when the read operation is executed than when the write operation is executed.

3. Third Embodiment

A memory system according to the third embodiment will be described with reference to FIG. 5. Since a configuration of the memory system according to the third embodiment is the same as the configuration of the memory system according to the first embodiment, the description thereof will be omitted. In the third embodiment, the probability of executing the persistence process is different according to a lifetime of the memory cell included in the target page. As an example, an operation flow that changes the probability of executing the persistence process when the ratio of the current number of write operations relative to the upper limit (endurance) of the number of write operations exceeds a predetermined threshold will be described.

The endurance described above is a limit value of the degree of wear of the memory cell, which guarantees the reliability of the memory cell. In the present embodiment, although a configuration in which the endurance is the upper limit of the number of write operations is exemplified, the endurance may be the upper limit of the number of read operations and may be the upper limit of the number of erase operations. Since the wear management section 14 only needs to be able to specify the endurance for each page, the endurance may be set for each page, or a predetermined endurance may be set for each of a plurality of pages. The endurance may be statically set in advance and may be dynamically changed by the wear management section 14, for example, depending on the operation history of the memory system or other factors.

3-1. Operation Flow of Wear Leveling Process and Persistence Process

Figure 5:
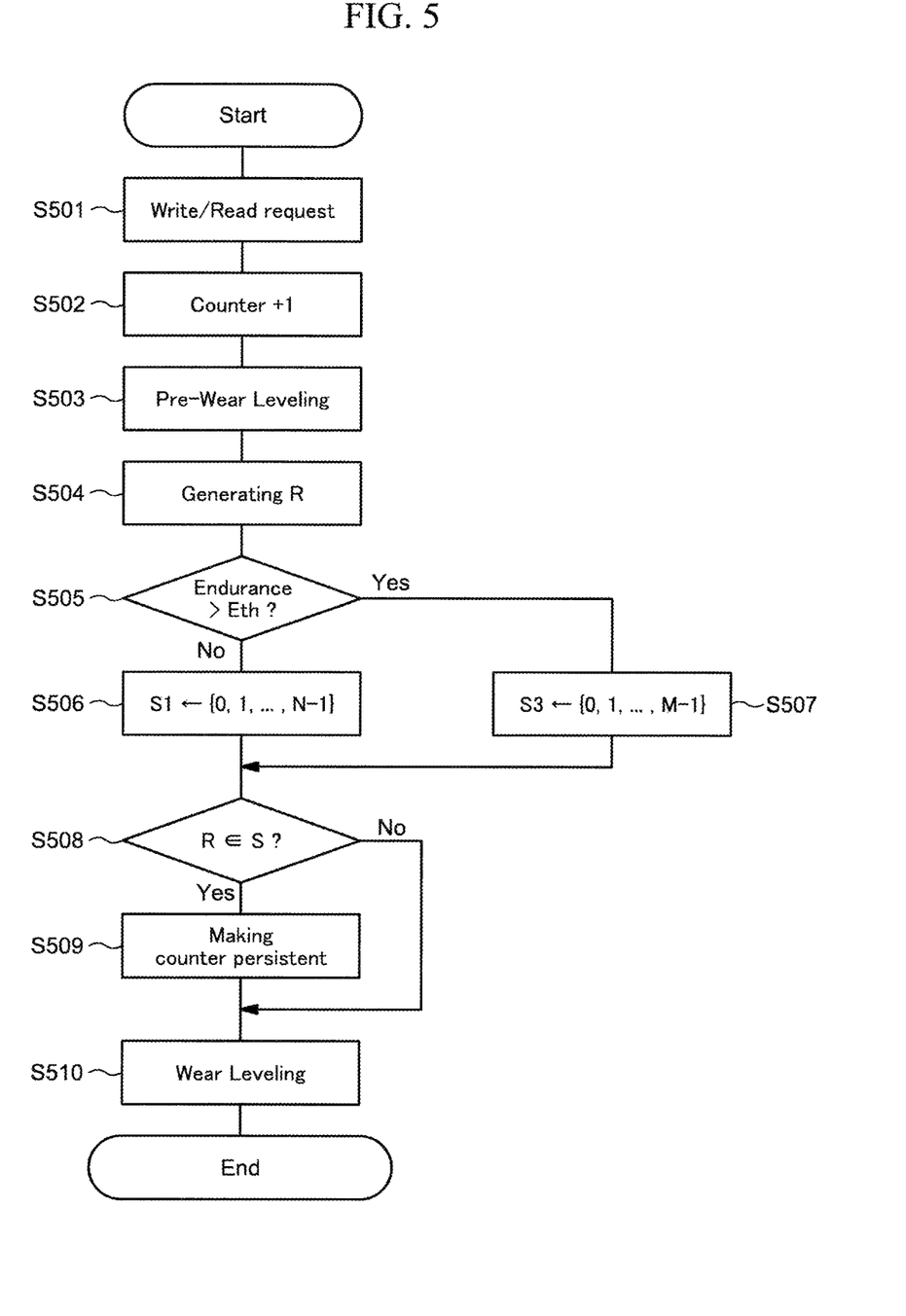
FIG. 5 is a flowchart showing a persistence process of a memory system according to an embodiment.

Since steps S501 to S504 in FIG. 5 is the same as S301 to S304 in FIG. 3, the description thereof is omitted. When a random number R is generated in S504, the ratio of the current number of write operations relative to the endurance is calculated for the page in which the write operation is executed, and the ratio is compared with a threshold Eth (Endurance>Eth?) (step S505). For example, when the threshold Eth is 90%, it is determined whether the current number of write operations to the target page exceeds 90% of the endurance.

The number of write operations described above may be a value of the wear counter or may be historical information in which the memory controller 10 executes the write operation.

In the case where the ratio is equal to or less than the threshold Eth ("No" in S505), the group S1 is selected (step S506). On the other hand, in the case where the ratio exceeds the threshold Eth ("Yes" in S505), the group S3 is selected (step S507). The group S1 is an integer from "0" to "N−1" (N is a natural number equal to or greater than 2).

The group S3 is an integer from "0" to "M−1" (M is a natural number equal to or greater than 3). M is greater than N. That is, the number of integers included in the group S3 is greater than the number of integers included in the group S1.

As described above, when the group S1 or the group S3 is selected, it is determined whether the random number R generated in S504 is included in the selected group (step S508). Since the steps S508 to S510 are the same as S305 to S307 in FIG. 3, the description thereof is omitted.

As described above, the number of integers included in the group S3 is M/N times the number of integers included in the group S1. Therefore, the probability of executing the persistence process when the ratio exceeds the threshold Eth is M/N times the probability of executing the persistence process when the ratio is equal to or less than the threshold Eth. That is, in the present embodiment, the probability of executing the persistence process can be changed over time depending on the number of write operations to the target page.

In a page where the number of write operations is close to the number of times related to the expected lifetime, since the life expectancy needs to be predicted more accurately, the loss of the latest wear information due to inappropriate disconnection has a significant effect. Therefore, as described above, by increasing the frequency at which the persistence process is executed, it is possible to reduce the possibility that an operation failure occurs less frequently than the number of times related to the expected lifetime.

As described above, in the present embodiment, depending on the operation history (the ratio of the current number of write operations relative to the endurance of the target page) of the non-volatile memory 20, the comparator 142 determines whether a random number R is included in a different group S1 or group S3. In the present embodiment, although the configuration in which the set is selected based on the history of the write operation to the non-volatile memory 20 is exemplified, the present disclosure is not limited to this configuration. For example, the selection of the set may be made based on the history of the read operation to the non-volatile memory 20.

In the present embodiment, although an operation flow in which the number of times of changing the probability of occurrence of the persistence process is one is exemplified, the present disclosure is not limited to this flow. The probability may be changed a plurality of times. For example, a plurality of thresholds may be provided, and the probability may be changed for each of the plurality of thresholds.

Although the present disclosure has been described above with reference to the drawings, the present disclosure is not limited to the embodiments described above and can be modified as appropriate without departing from the spirit of the present disclosure. For example, the addition, deletion, or design change of components as appropriate by those skilled in the art based on a wear management circuit of the present embodiment are also included in the scope of the present disclosure as long as they are provided with the gist of the present disclosure. Furthermore, each of the embodiments described above as an embodiment of the present disclosure can be appropriately combined and implemented as long as no contradiction is caused.

Further, it is understood that, even if the effect is different from those provided by each of the above-described embodiments, the effect obvious from the description in the specification or easily predicted by persons ordinarily skilled in the art is apparently derived from the present disclosure.

What is claimed is:

1. A memory system comprising:
   a non-volatile memory; and
   a memory controller including a counter, the memory controller being configured to control a write operation to the non-volatile memory and a read operation from the non-volatile memory and configured to obtain wear information of the non-volatile memory,
   wherein the memory controller is configured to
     update the counter based on the wear information,
     upon determining that a first value exists within a group of second values,
     execute a persistence process configured to store information of the counter in a non-volatile manner.

2. The memory system according to claim 1, wherein the wear information includes number information indicating at least one of the number of times the write operation and the read operation are executed with respect to a particular page included in the non-volatile memory.

3. The memory system according to claim 2, wherein the memory controller is configured to
   store the number information associated with the particular page in the counter, and
   store the number information in the non-volatile manner by executing the persistence process.

4. The memory system according to claim 1, wherein the memory controller is configured to store information of the counter in the non-volatile manner in a part of the area of the non-volatile memory by executing the persistence process.

5. The memory system according to claim 4, wherein the memory controller is configured to
   execute pre-processing configured to determine whether a wear leveling process configured to move data in the non-volatile memory based on the wear information is executed, before determining that the first value exists within the group of second values and after the counter is updated based on the wear information, and
   execute the wear leveling operation after the persistence process.

6. The memory system according to claim 1, wherein the memory controller further includes a cache memory configured to store the wear information in a volatile manner.

7. The memory system according to claim 6, wherein the memory controller is configured to store the wear information stored in the cache memory in the non-volatile manner in a part of the area of the non-volatile memory by executing the persistence process.

8. The memory system according to claim 1, wherein the memory controller includes a random number generator configured to generate the first value based on an updated process of the counter, and
a comparator configured to determine whether first value is included in the group of second values.

9. The memory system according to claim 8, wherein the group used for executing the determination by the comparator in the case where an operation of the memory controller is the write operation is the same as the group used for executing the determination by the comparator in the case where an operation of the memory controller is the read operation.

10. The memory system according to claim 8, wherein the group used for executing the determination by the comparator in the case where an operation of the memory controller is the write operation is different from the group used for executing the determination by the comparator in the case where an operation of the memory controller is the read operation.

11. The memory system according to claim 8, wherein the group is selected so that a probability with which the persistence process is executed based on the write operation is higher than a probability with which the persistence process is executed based on the read operation in the case where a magnitude of wearing based on the write operation is larger than a magnitude of wearing based on the read operation.

12. The memory system according to claim 8, wherein the comparator is configured to determine whether the first value is included in the different groups depending on an operation history of the non-volatile memory.

13. The memory system according to claim 12, wherein the operation history includes a ratio of the number of times the present write or read operations are executed with respect to endurance with respect to a particular page included in the non-volatile memory.

14. The memory system according to claim 13, wherein the group is selected so that a probability of the persistence process being executed is higher when the ratio exceeds a threshold value than when the ratio is less than or equal to the threshold value.

15. The memory system according to claim 1, further comprising a power loss protection circuit configured to detect a disconnection of a power source to the non-volatile memory,
   wherein the power loss protection circuit is configured to execute the persistence process in the case where the disconnection of the power source to the non-volatile memory is detected.

16. The memory system according to claim 15, wherein the power loss protection circuit is configured to execute the persistence process, if the first value does not exist within the group of second values, in the case where an inappropriate and unintentional disconnection of a power source to the non-volatile memory is detected.

17. The memory system according to claim 1, wherein the non-volatile memory includes at least one of a NAND type flash memory, a NOR type flash memory, a phase change memory (PCM), a resistive random access memory resistive random access memory (RePAM), a magnetoresistive random access memory (MRAM), a ferroelectric random access memory (FeRAM) and oxide semiconductor random access memory (OSRAM).

* * * * *